(12) United States Patent
Zhu

(10) Patent No.: US 10,305,416 B2
(45) Date of Patent: May 28, 2019

(54) MOUNTING APPARATUS FOR SOLAR PANELS

(71) Applicant: Guohao Zhu, Haining (CN)

(72) Inventor: Guohao Zhu, Haining (CN)

( * ) Notice: Subject to any disclaimer, the term of this patent is extended or adjusted under 35 U.S.C. 154(b) by 0 days.

(21) Appl. No.: 15/390,011

(22) Filed: Dec. 23, 2016

(65) Prior Publication Data

US 2018/0138854 A1    May 17, 2018

(30) Foreign Application Priority Data

Nov. 16, 2016 (CN) .......................... 2016 1 1007919

(51) Int. Cl.
*H02S 20/23* (2014.01)
*H02S 30/00* (2014.01)

(52) U.S. Cl.
CPC .............. *H02S 20/23* (2014.12); *H02S 30/00* (2013.01); *Y02B 10/12* (2013.01)

(58) Field of Classification Search
CPC ...................................................... H02S 20/23
USPC ....................................................... 52/173.3
See application file for complete search history.

(56) References Cited

U.S. PATENT DOCUMENTS

| 6,269,596 | B1* | 8/2001 | Ohtsuka | E04D 3/366 126/621 |
| 8,122,648 | B1* | 2/2012 | Liu | F24J 2/5245 126/623 |
| 8,938,932 | B1* | 1/2015 | Wentworth | H02S 20/23 52/173.3 |
| 9,331,629 | B2* | 5/2016 | Cheung | F24J 2/5256 |
| 2011/0203637 | A1* | 8/2011 | Patton | F24J 2/5205 136/244 |
| 2012/0073220 | A1* | 3/2012 | Kobayashi | E04D 1/30 52/173.3 |
| 2015/0135608 | A1* | 5/2015 | Shibata | F24J 2/5233 52/126.1 |
| 2016/0126884 | A1* | 5/2016 | Stearns | H02S 20/23 52/173.3 |

FOREIGN PATENT DOCUMENTS

| CN | 203367303 U | 12/2013 |
| CN | 204498061 U | 7/2015 |

* cited by examiner

*Primary Examiner* — Charles A Fox
*Assistant Examiner* — James J Buckle, Jr.
(74) *Attorney, Agent, or Firm* — Fox Rothschild LLP

(57) ABSTRACT

The present invention provides a mounting apparatus for attaching solar panels to a roof top. The apparatus includes a mounting base installable on a roof top and a mounting bracket attached to the mounting base. Also provided is a method of installing solar panels on a roof top through the mounting apparatus disclosed herein.

25 Claims, 18 Drawing Sheets

MOUNTING APPARATUS FOR SOLAR PANELS

CROSS-REFERENCE TO RELATED APPLICATIONS

This application claims priority to Chinese Patent Application No. 201611007919.9, filed Nov. 16, 2016, the disclosure of which is incorporated herein by reference.

FIELD OF THE INVENTION

The present invention relates to a mounting apparatus and a method of installing solar panels.

BACKGROUND OF THE INVENTION

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules (or "solar tiles") interconnected with wiring to one or more appropriate electrical components (e.g., switches, inverters, junction boxes, etc.).

Most PV applications entail placing an array of solar modules at the installation site in a location where sunlight is readily present. This is especially true for residential, commercial or industrial applications in which multiple solar modules are desirable for generating substantial amounts of energy, with the rooftop of the structure providing a convenient surface at which the solar modules can be placed. it can be important to ensure that the array of solar modules or panels is reliably and stably anchored to the roof, whether the roof is an angled or flat roof. Moreover, it can be important to ensure that a user can easily, effectively, and rapidly mount one or more solar module(s) or panels to the roof.

SUMMARY OF THE INVENTION

An aspect of the invention provides a mounting apparatus for attaching one or more solar panels to a roof top. The apparatus includes a mounting base installable on a roof top and a mounting bracket attached to the mounting base.

The mounting bracket includes a rectangular mounting plate, a first and second inner side plates connected to two opposite edges of the mounting plate and extending upward from the mounting plate perpendicularly, wherein first and second inner side plates are further connected to a respective parallel first and second outer side plates via a ridge portion, further wherein the inner and outer side plates each comprise a cutout from the top ridge thereof for receiving a frame of one or more solar panels, the cutout having two opposing side edges and a bottom edge above the mounting plate, further wherein the bottom edge of the cutout is parallel to the mounting plate and extends beyond both side edges of the cutout to form a first and second guide channels on each side edge, each of the first and second guide channels is configured to engage a L-shaped portion of a frame of a solar panel.

Another aspect of the invention provides a method of installing one or more solar panels on a roof top. The method includes the steps of:

(a) placing a plurality of mounting brackets on a plurality of mounting bases, wherein the plurality of mounting bases are installed in at least a first and second row, and wherein the mounting bracket comprises:

a first and second inner side plates connected to two opposite edges of the mounting plate and extending upward from the mounting plate perpendicularly, wherein first and second inner side plates are further connected to a respective parallel first and second outer side plates via a ridge portion, further wherein the inner and outer side plates each comprise a cutout from the top ridge thereof for receiving a frame of one or more solar panels, the cutout having two opposing side edges and a bottom edge above the mounting plate, further wherein the bottom edge of the cutout is parallel to the mounting plate and extends beyond both side edges of the cutout to form a first and second guide channels on each side edge, each of the first and second guide channels is configured to engage a L-shaped portion of a frame of a solar panel;

(b) placing a solar panel on the mounting brackets in the first row and the second row, wherein a front bottom frame of the solar panel aligns with the first guide channel of the mounting brackets in the first row, and a rear bottom frame of the solar panel aligns with the second guide channel of the mounting brackets in the second row;

(c) sliding the front bottom frame so that an L-shaped arm of the front bottom frame fully engages with the first guide channel of the mounting bracket in the first row; and (d) sliding the mounting bracket in the second row so that an L-shaped arm of the rear bottom frame fully engages with the second guide channel of the mounting bracket in the second row.

DETAILED DESCRIPTION OF THE INVENTION

Figure 1:
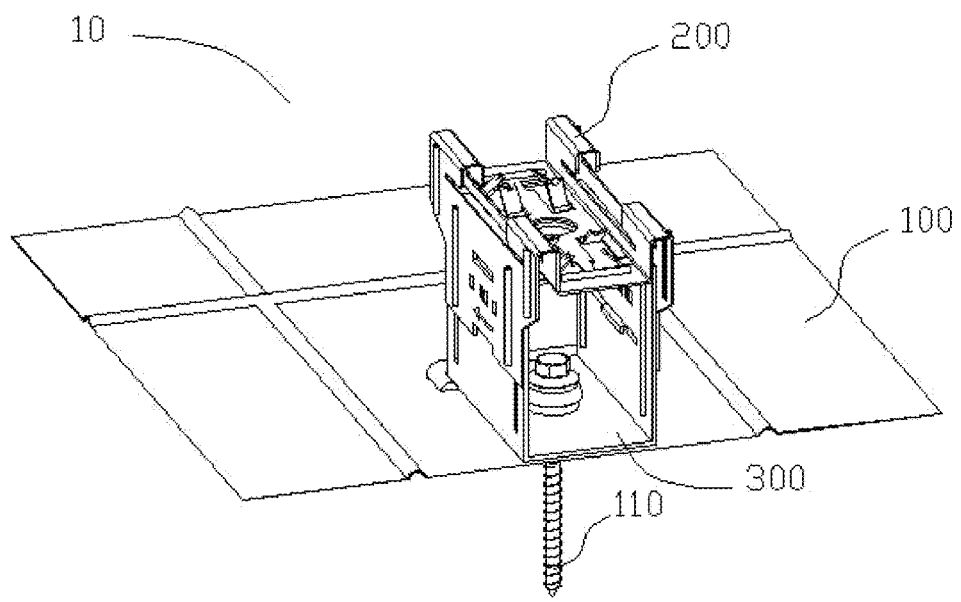
FIG. 1 illustrates a mounting assembly 10 including an anchor plate 100, a mounting bracket 200 and a mounting base 200.

Various embodiments of the invention disclose an apparatus for mounting a photovoltaic system. The apparatus is structurally and functionally advantageous over conventional devices in terms of simplified and improved components and enhanced stability. The apparatus also allows for fast and convenient adjustment during the mounting process of solar panels. The low cost of manufacturing further adds to the benefit of the apparatus.

While the inventions disclosed herein are often described in the context of photovoltaic panels, arrays and modules, these inventions can be used in other contexts as well, such as concentrated PV systems, thermal solar systems, etc.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Referring to FIG. 1, a first embodiment of a mounting assembly 10 includes an anchor plate 100, a mounting bracket 200 and a mounting base 200. The assembly 10 is secured to a structure such as rooftop via a screw 110.

Figure 2:
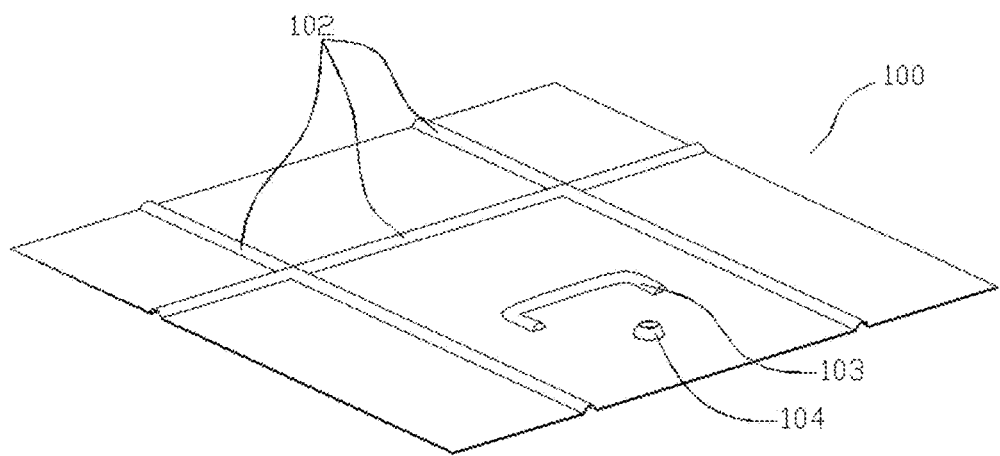
FIG. 2 illustrates an anchor plate 100 including reinforcement bars 102, water guard 103 and an anchor point 104.

Referring to FIG. 2, an exemplary anchor plate 100 includes reinforcement bars 102, water guard 103 and an anchor point 104.

Figure 3:
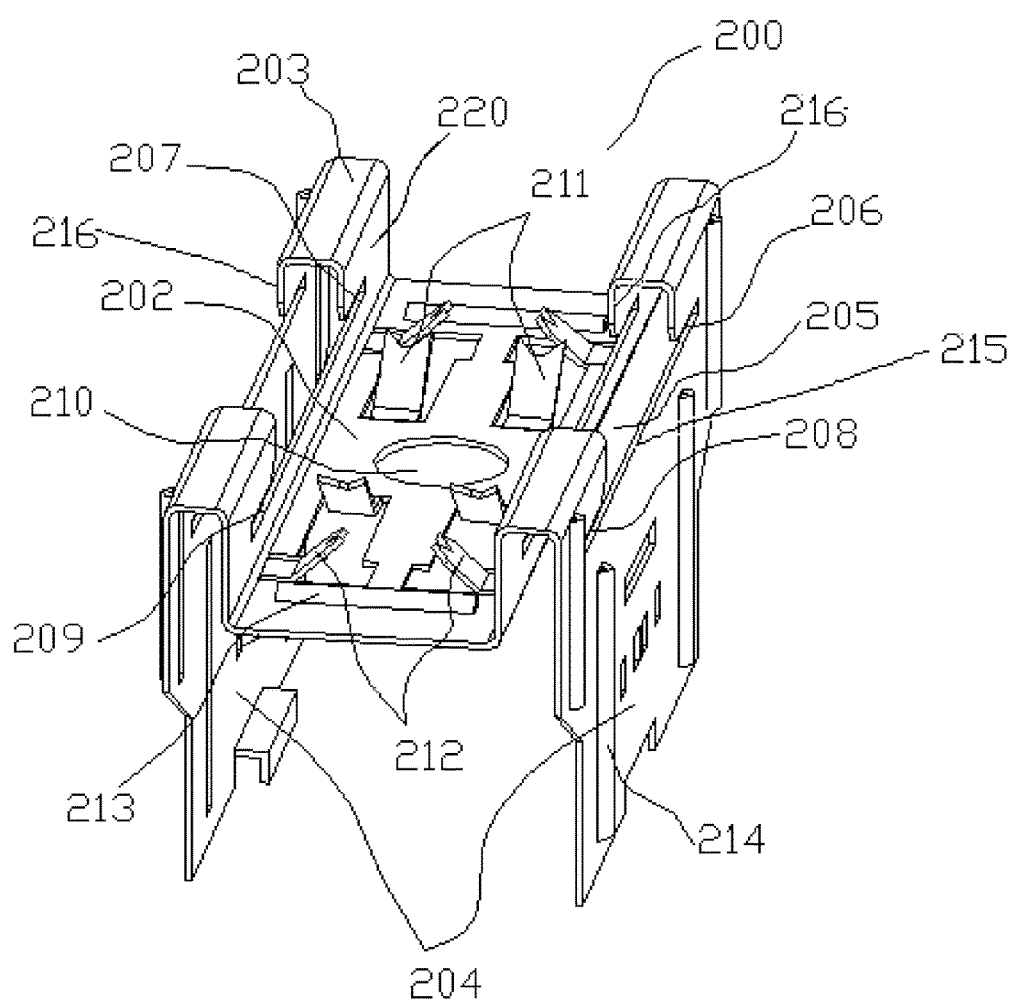
FIG. 3 illustrates a mounting bracket 200 including mounting plate 202, ridge portions 203, outer side plates 204, cutout 205, first guide channels 206 and 207, second guide channels 208 and 209, first resilient protrusion 211, second resilient protrusion 212, reinforcement bar 213, reinforcement bar 214, bottom edge 215, side edge 216, and inner side plate 220.
Figure 4:
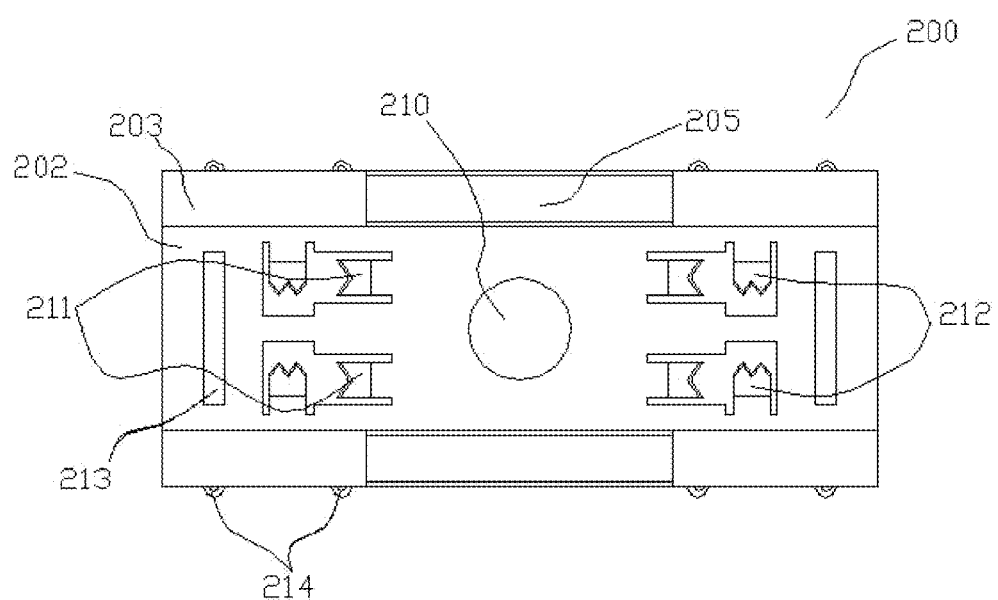
FIG. 4 illustrates a top view of the mounting bracket 200.

Referring to FIGS. 3-4, an exemplary mounting bracket 200 includes mounting plate 202, ridge portions 203 on both sides of the bracket 200, outer side plates 204, cutout 205, first guide channels 206 and 207, second guide channels 208 and 209, first resilient protrusion 211, second resilient protrusion 212, reinforcement bar 213, reinforcement bar 214, and inner side plate 220.

Figure 5:
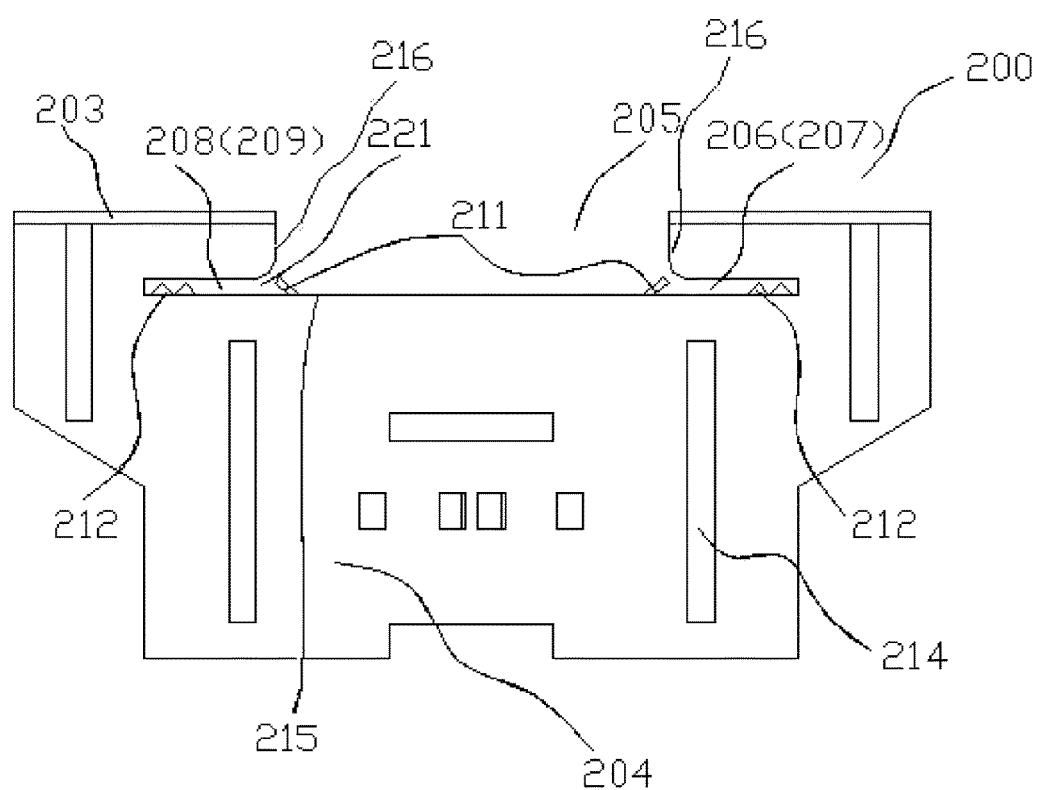
FIG. 5 illustrates a side view of the mounting bracket 200.

Referring to FIG. 5, each of the side plates 220 and 204 includes a cut-out extending from the ridge portion towards the mounting plate. The plane across the lower end of the cut-outs is adjacent or below the first resilient protrusion 211 and/or second resilient protrusion 212. The cut-out then extend laterally in opposite directions to form the first guide channel 206 and 207 and the second guide channel 208 and 209. Preferably, the entry point 221 is wider than the inner end of the guide channel. In some embodiments, the entry point 221 has a convex surface so that the arm of the solar panel can slide in easily.

Figure 6:
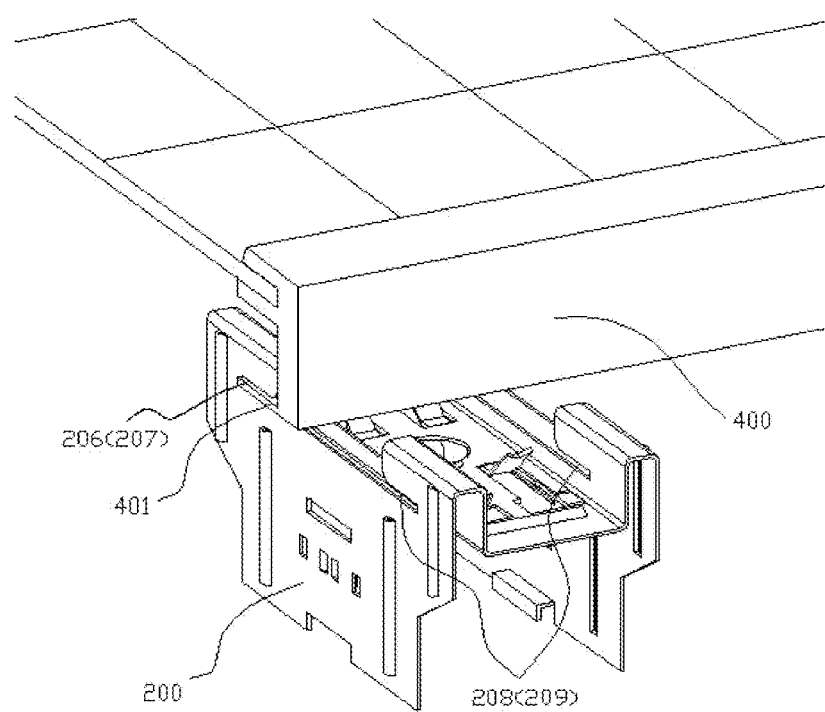
FIG. 6 illustrates the engagement of the L-shaped arm 401 into the guide channel 206 (207).
Figure 7:
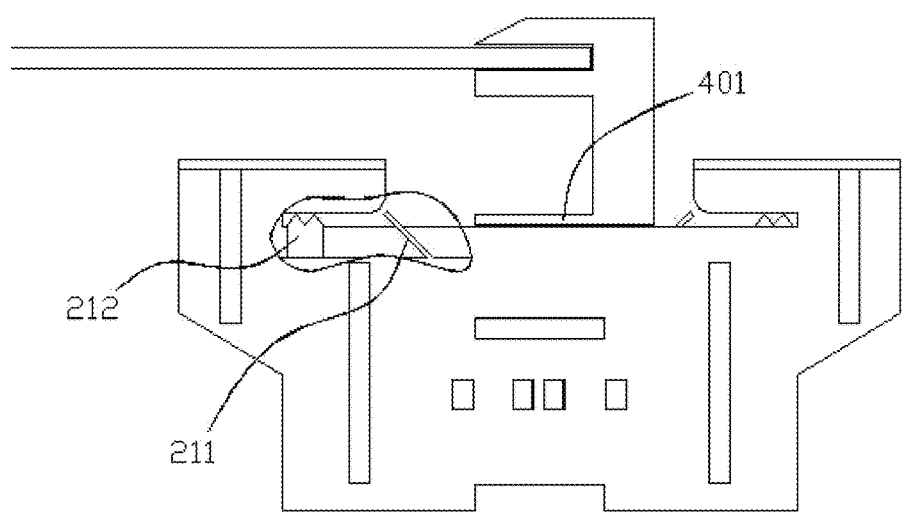
FIG. 7 illustrates a side view of the first protrusion 211 and the second protrusion 212 for securing the L-shaped arm 401 in the guide channel 206 (207).
Figure 8:
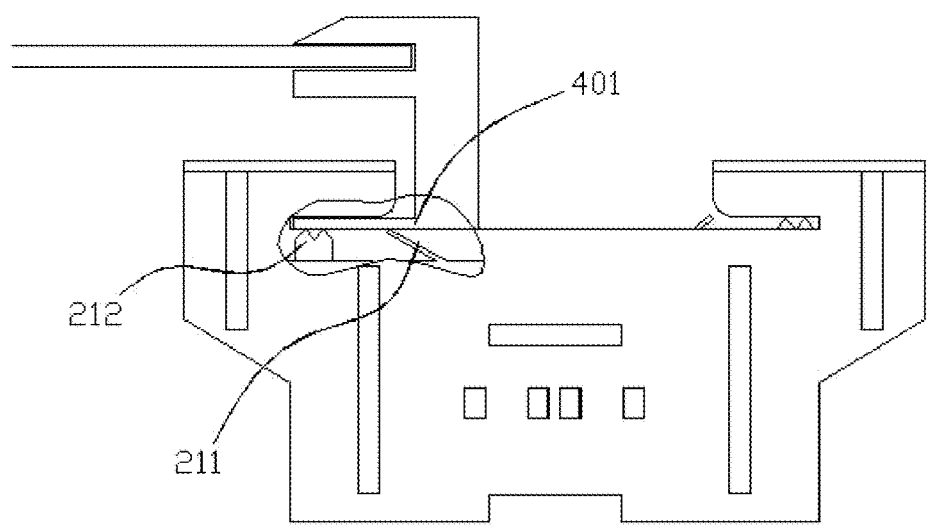
FIG. 8 illustrates a side view of the first protrusion 211 and the second protrusion 212 in contact with the L-shaped arm 401.

The mounting plate 202 in FIG. 3 includes first resilient protrusions 211 and second resilient protrusions 212. The first resilient protrusions 211 point away at an angle from a virtual plane across the middle of the cutouts on both sides of the mounting plate. As is illustrated in FIGS. 6-8, the first resilient protrusion 211 can have a serrated top edge configured to touch a bottom surface of the frame of the solar panel when the L-shaped portion of the frame of the solar panel is fully engaged with the first or second guide channel so that the solar panel is prevented from longitudinal movement along the guide channel. Similar to the first resilient protrusions 211, the second resilient protrusion 212 can similarly have a serrated top edge configured to touch a bottom surface of the frame of the solar panel. However, the second resilient protrusions 212 are oriented parallel to the virtual plane across the middle of the cut-outs on both sides of the mounting plate. Therefore, when the L-shaped portion of the frame of the solar panel is fully engaged with the first or second guide channel, the solar panel is prevented from lateral movement perpendicular to the guide channel.

Figure 9:
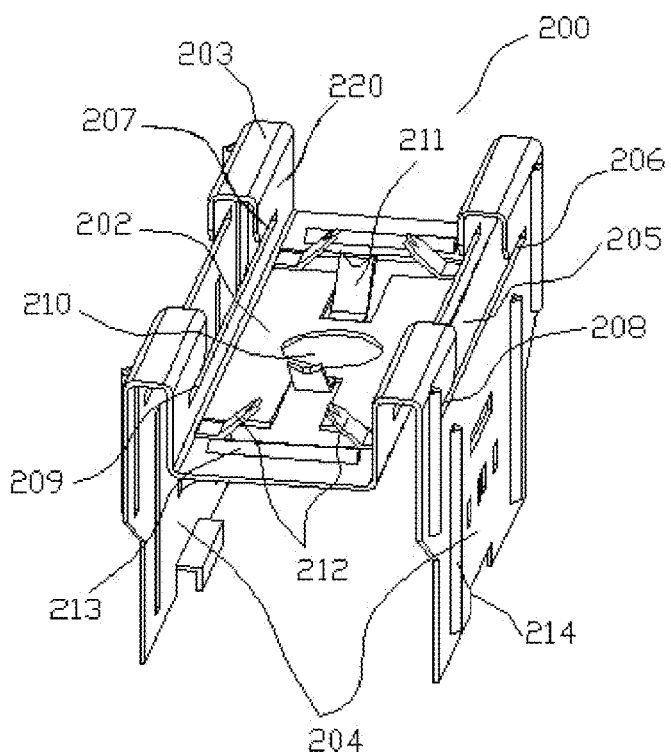
FIG. 9 illustrates a single pair of first resilient protrusions 211 in the mounting bracket 200.

The first resilient protrusions 211 are preferably symmetrical to the center of the mounting plate. Alternatively, thy can be symmetrically aligned to a virtual plane across the middle of the cut-outs on the both sides mounting plate. The second resilient protrusions 212 can also be symmetrically aligned to the center of the plate or to the virtual plane. Although FIG. 4 exemplifies two pairs of symmetrically aligned first resilient protrusions 211, a single pair of first resilient protrusions 211 as shown in FIG. 9 can also be used depending on various factors as wind speed of the location. Likewise, the number of the second resilient protrusions 212 can vary according to cost and environmental considerations. In exemplary embodiments, the mounting plate 202 can have independently 1, 2, 3, 4, 5, 6, 7, or 8 first and/or second resilient protrusions. In some embodiments, the protrusions can be formed from a cut-out from the mounting plate. In some embodiments, the structural components of the mounting bracket, including the mounting plate, the inner and outer side plates and the ridge portion, are manufactured from a single piece of metal plate.

There can be various alternative embodiments to the first resilient protrusions 211 and the second resilient protrusion 212. For example, in some embodiments, the second resilient protrusions 212 can be closer to the entry point of the guiding channel than the first resilient protrusions 211 so that the L-shaped portion of the frame of the solar panel first engages 212 followed by 211. In further embodiments, the mounting plate can contain one of the first resilient protrusions 211 and second resilient protrusions 212. In further embodiments, the first resilient protrusions 211 do not have to be each parallel to the side plate. As long as they serve the purpose of preventing longitudinal movement of the solar panel along the guide channel, the orientation of the protrusion can vary. Likewise, the orientation of the second resilient protrusions does not have to be strictly parallel to the virtual plane across the middle of the cut-outs on both sides of the mounting plate if they provide resistance against lateral movement perpendicular to the guide channel.

Figure 10:
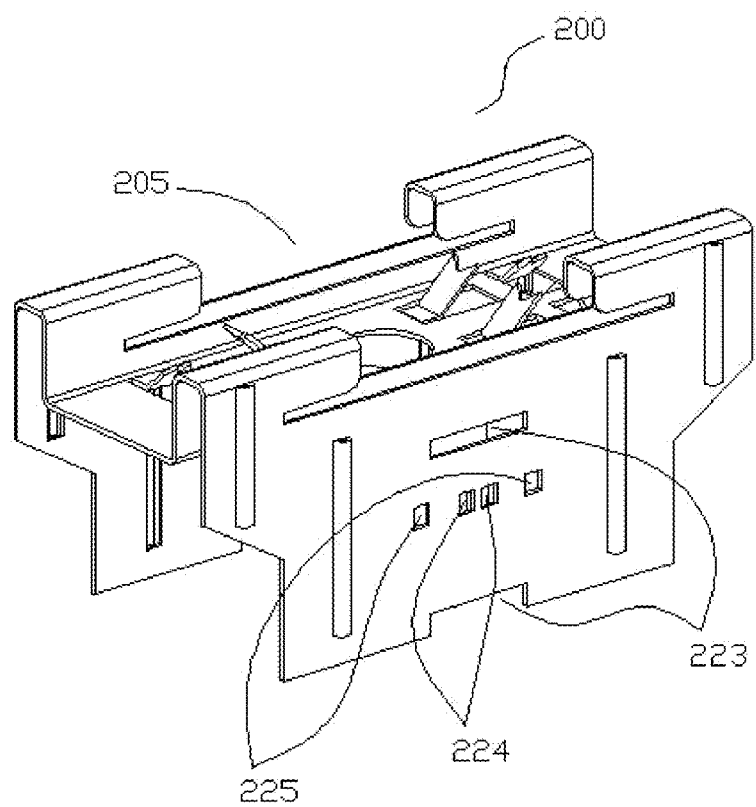
FIG. 10 illustrates mounting bracket 200 including supporting arms 223, locking teeth 224 and locking hole 225.
Figure 11:
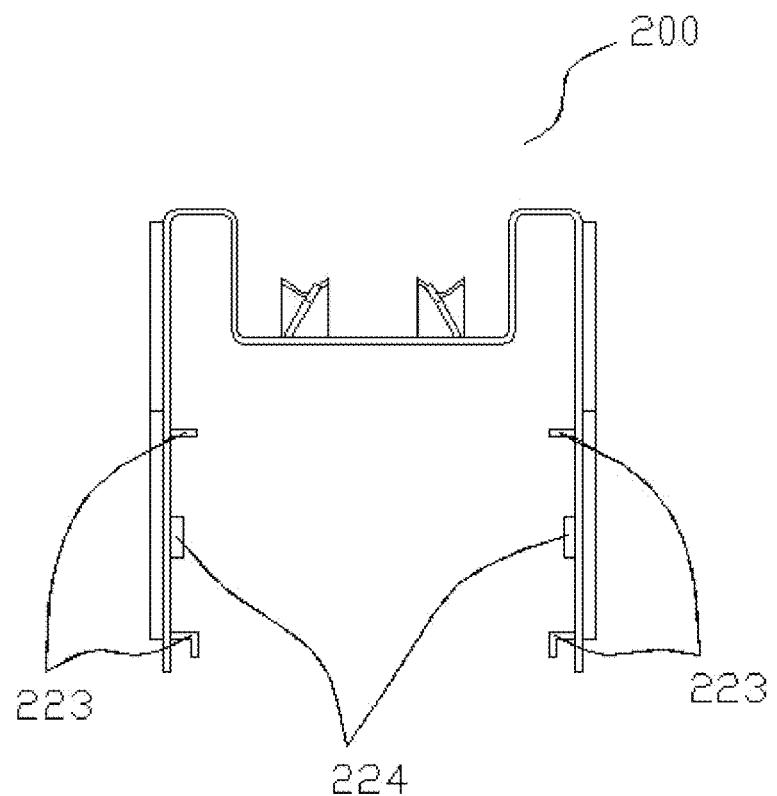
FIG. 11 illustrates mounting bracket 200 including supporting arms 223 and locking teeth 224.
Figure 12:
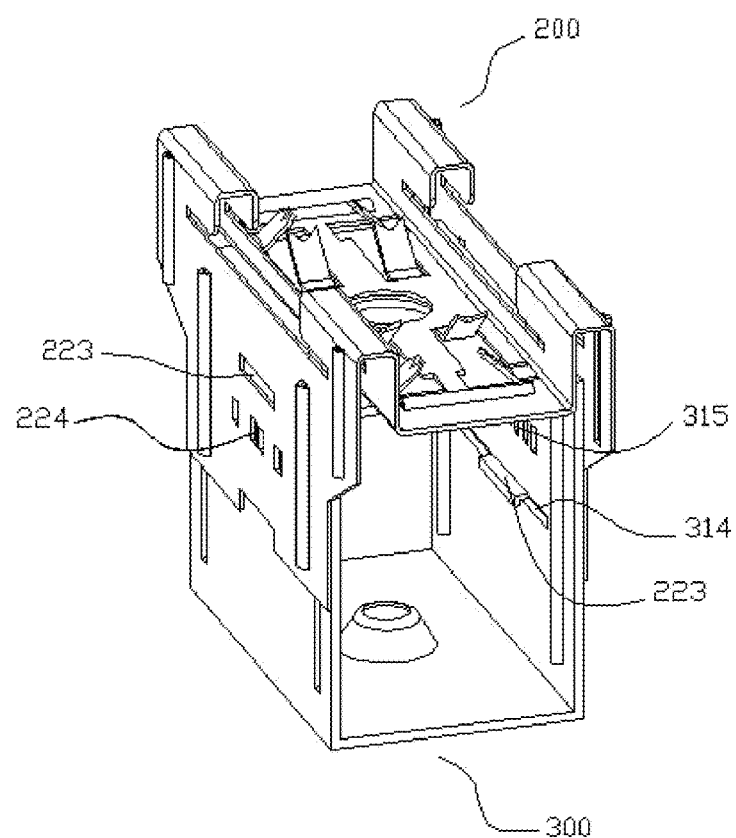
FIG. 12 illustrates mounting bracket 200 engaging with mounting base 300.

The mounting bracket 200 also include an adjustment means which engages the bracket with mounting base 300 and allows for spatial adjustment before fixing the bracket 200 to a desirable position. As illustrated in FIGS. 10 and 11, the mounting bracket 200 includes supporting arms 223 extending perpendicularly from the side plate. When the mounting bracket 200 engages initially with the mounting base 300 as illustrated in FIG. 12, the supporting arms 223 dock into the adjustment channel 314 which allows the bracket 200 to slide along the channel. A desired position can be secured by subsequently engaging the teeth 224 with the locking hole 315 on the mounting base. Meanwhile, the locking hole 225 can engage with teeth on the mounting base to reinforce the attachment of the mounting bracket 200 to the mounting based 300.

The locking means can include any combination of teeth and locking holes. For example, the side plate of the bracket may include one or both of the teeth and the locking holes. The mounting base can have one or both of the matching locking holes and the teeth to lock the mounting bracket in position.

Reinforcement bars 213 and 214 enhance the stability of the bracket and the durability of the overall assembly. However, the reinforcement bars can also be positioned at any portion of the bracket and in any orientation suitable. The shape of the reinforcement component is certainly not limited to bars and can include shapes such as cross and circles.

The optional aperture 210 on the mounting plate provides an access window to the mounting base, which can be secured to the anchor plate 100 with a screw. The shape, size and location of the aperture can certainly vary depending on the specific design and purpose of the aperture.

Figure 13:
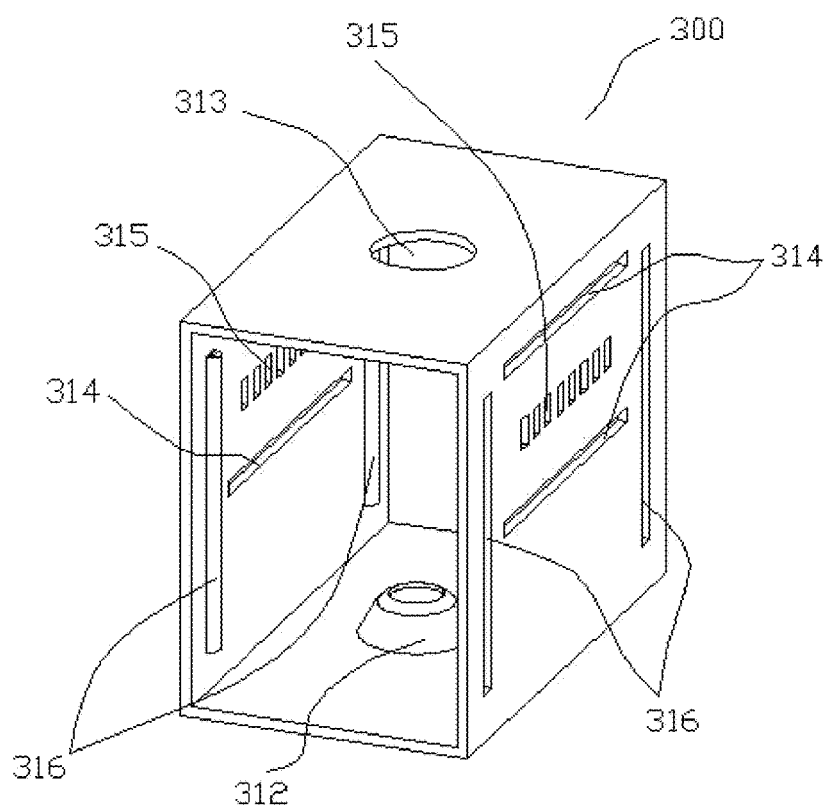
FIG. 13 illustrates a mounting base having adjustment channel 314.

Referring to FIGS. 12 and 13, an exemplary embodiment of the mounting base 300 includes a box having a top, a bottom, a first and second side wall each disposed between the top and the bottom. The mounting base is installable on a roof top and movably attachable to the mounting bracket. The first and second side walls has an adjustment means located thereon and configured to engage with the supporting arm 223 of the mounting bracket and adjust position of the mounting bracket relative to the mounting base when the mounting bracket is placed on the mounting base. The adjustment means in FIG. 13 includes an adjustment channel 314 located on the side wall for receiving a supporting arm 223 so that the mounting bracket is slidable along the adjustment channel once the mounting bracket is placed on the mounting base, wherein the adjustment channel is parallel to the top of the box. The number and location of the adjustment channel can be the same or different on each of the side walls. The length of an adjustment channel may also be the same or different from other channels.

The mounting base can include one or more groups of locking holes 315 or channel 314. The bracket can include adjustment means such as locking teeth 224 and supporting arm 223. The locking hole 315 matches one or more of the locking teeth 224 to secure the supporting arm into the channel of the mounting base.

While the adjustment channel 314 is shown to be parallel to the top of the box, it can also be aligned with an angle relative to the top. When the mounting base and the bracket are to be installed on a rooftop with a slope, such an angle will offset the slope to place the adjustment channel horizontally. As a result, the weight of the supporting arm 223 of the mounting bracket 200 will be evenly placed on the adjustment channel rather 314 than at a lower end of the channel. Certainly, such a modified adjustment channel also requires a same angle for the supporting arm 223 relative to the mounting plate 202.

The adjustment means can further include an array of locking holes 315 on the first and second side walls of the mounting base, wherein the array of locking holes 315 are aligned parallel to the top of the box and are configured to engage with one or more teeth on a side plate of the mounting bracket so that the mounting bracket can be locked at a desired position in the adjustment channel on the mounting base.

The adjustment means on the mounting base can further include one or more teeth or locking pins on at least one of the first and second side walls of the mounting base. The one or more teeth will engage with one or more locking holes on one or more of the side plates of the mounting bracket to lock the mounting bracket in a particular position along the adjustment channel on the mounting base.

The adjustment means can include one or both of the locking holes and locking pins to match the respective locking pins and locking holes on the mounting bracket. The number of pins or holes and their locations can be adjusted to improve the stability of the mounting bracket on the mounting base.

The mounting base 300 also includes supporting tabs 317 on the first and second side walls. The supporting tabs 317 protrude from the surface of the side wall to engage with a bottom edge of the mounting bracket to provide support for the mounting bracket when placed on the mounting base.

One or more reinforcement bars 316 can be installed on the side walls of the mounting base. The number, shape and location of the reinforcement bars can vary so long as they serve the purpose of providing enhanced stability and durability.

An installation screw secures the mounting base 300 to the anchor plate through a mounting hole 312. An aperture 313 on the top of the mounting base 300 provides an access to install or remove the screw. The aperture can also be in a different shape if it does not compromise the integrity and durability of the whole assembly. In some embodiments, the structural components of box of the mounting base, including the top, the bottom, and the side walls are made from a one-piece metal plate.

Figure 14:
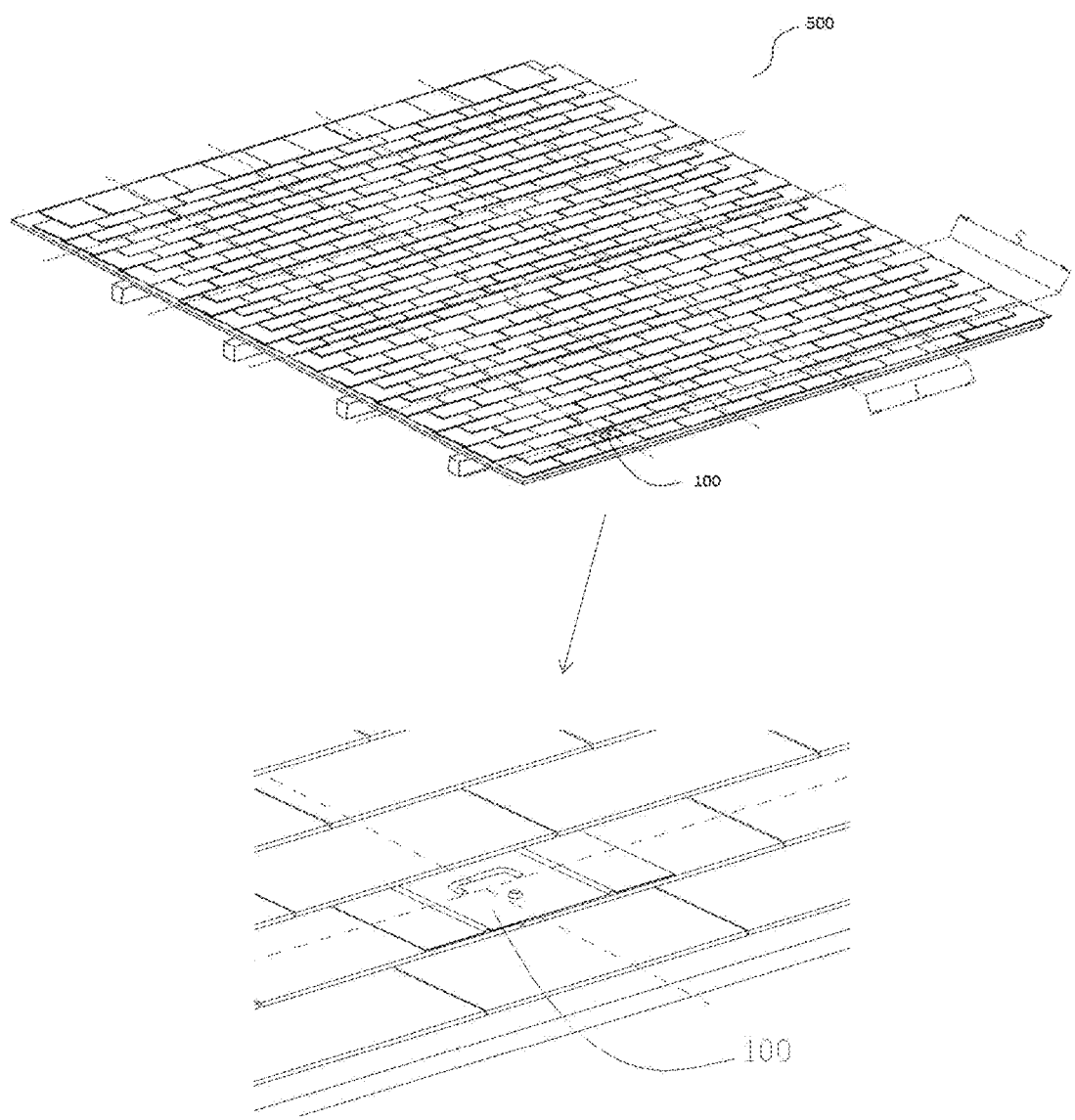
FIG. 14 illustrate anchor plate 100 installed on a roof top.

Another aspect of the invention provides a method of installing one or more solar panels on a structure or a roof top. As illustrated in FIG. 14, the distance between each row of mounting apparatus is represented by S, which is defined by the sum of the width of a solar panel and the gap between solar panels. The distance between each column of mounting apparatus is represented by L, which is defined by the sum of the length of a solar panel and half of the gap between solar panels. The mounting base 300 is secured to the anchor panel 100 at the anchor point.

Generally, after the mounting bases 300 are installed, the mounting brackets 200 are place on a top surface of the mounting bases 300. One or more supporting arms 223 of the mounting bracket 200 are engaged with one or more adjustment channels 314 on the mounting base 300. The mounting brackets 200 are slidable along the adjustment channel. The components of the mounting brackets 200 and the mounting bases 300, including supporting arms, guide channels, and locking means are as described above.

Figure 15:
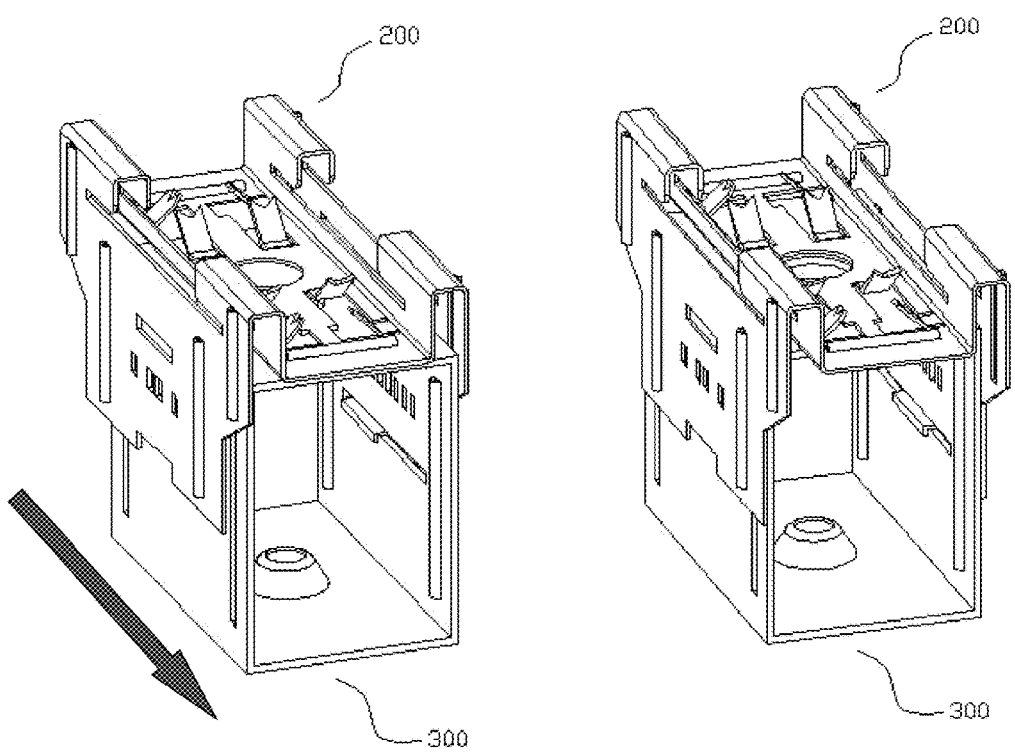
FIG. 15 illustrates the process of setting up the mounting bracket 200 on the mounting base 300.

Next, by sliding the supporting arm 223 of the mounting bracket 200 in a top or higher row further along the guide channel 314 on the mounting base 300, the mounting bracket 200 is fully engaged with the mounting base 300 as shown in FIG. 15. The locking means such as teeth 224 and locking holes 225 interact with the counterpart components on the mounting base 300 to further strengthen the attachment of the mounting bracket 200 to the mounting base 300.

Figure 16:
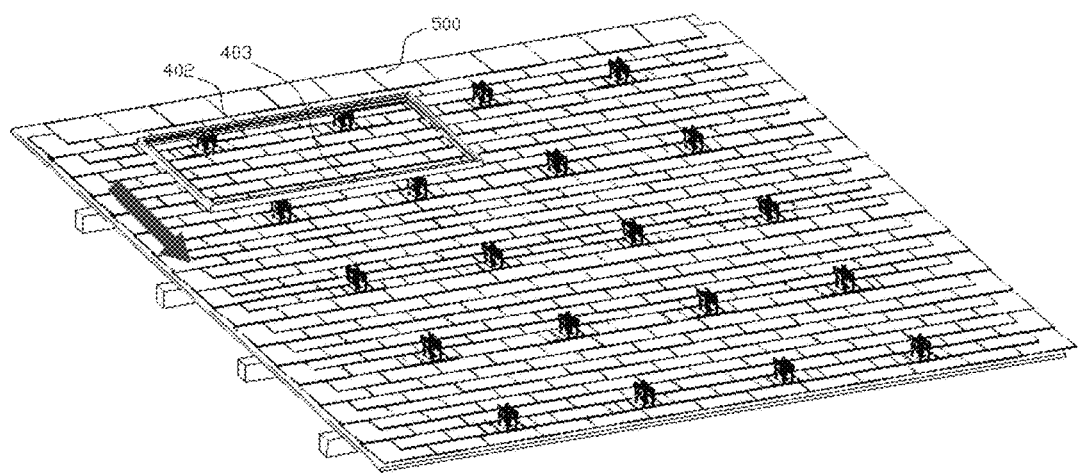
FIG. 16 illustrates the step of placing a front bottom frame 402 of the solar panel 400 into the cutout of the mounting bracket in first row so that the L-shaped arm 401 of the front bottom frame 402 is aligned with the first guide channel.

Next, a front bottom frame 402 of the solar panel 400 is then placed into the cutout of the mounting bracket in first row so that the L-shaped arm 401 of the front bottom frame 402 is aligned with the first guide channel as shown in FIG. 16. A rear bottom frame 403 of the solar panel is also placed into the cutout of the mounting bracket in a second row. The L-shaped arm 401 of the rear bottom frame 402 is aligned with the second guide channel of the mounting bracket in the second row. The first row can be a top or higher row and the second row can be an adjacent lower row.

Figure 17:
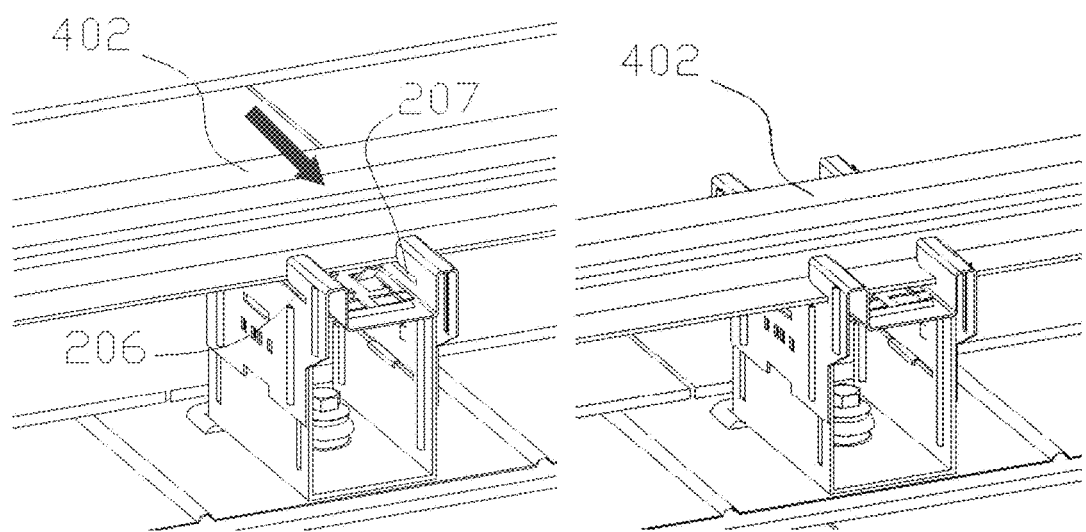
FIG. 17 illustrates a step of installing the solar panel by sliding the front bottom frame 402 of the solar panel 400.

Next, the front bottom frame 402 of the solar panel 400 is slid downward as shown in FIG. 17. As a result, the L-shaped arm 401 of the front bottom frame 402 fully engages with the first guide channel 206 and 207 of the mounting bracket in the first row. If there are two or more mounting brackets in contact with the front bottom frame 402, sliding the frame enables the L-shaped arm 401 to fully engage with the first guide channels of those mounting brackets.

Figure 18:
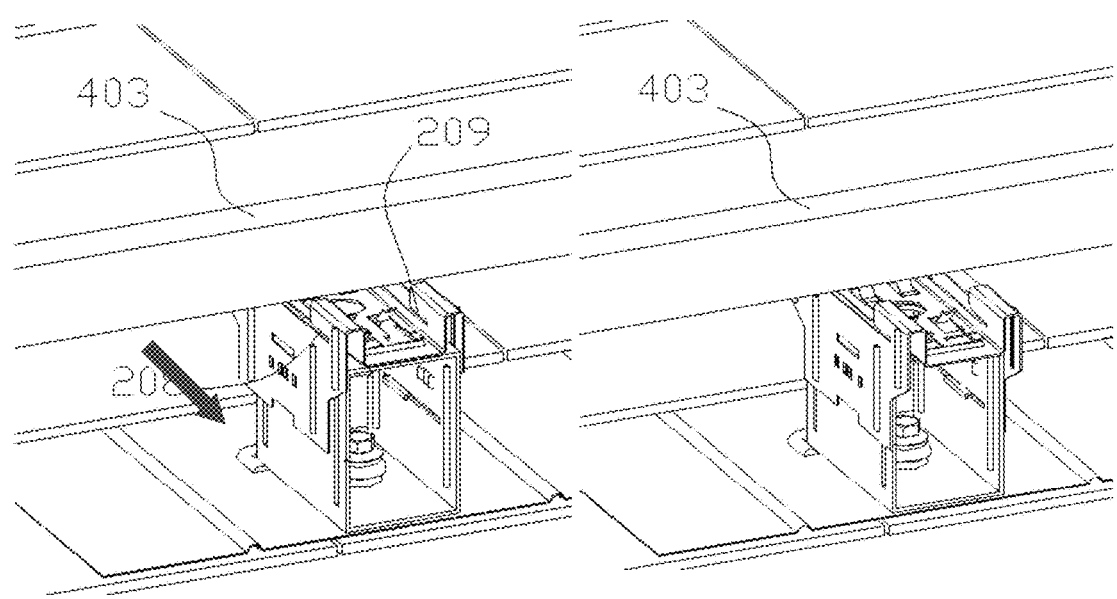
FIG. 18 illustrates a step of installing the solar panel by sliding the mounting bracket downward to engage the L-shaped arm 401 of the rear bottom frame 402.

Next, the mounting bracket in the second row is slide downward as shown in FIG. 18. Therefore, the L-shaped arm 401 of the rear bottom frame 402 fully engages with the second guide channel 208 and 209 of the mounting bracket in the second row. The L-shaped arm can fully engage with two or more second guide channels by sliding the respective mounting brackets in the same row. The mounting bracket in the second row is then secured to the respective mounting base via a locking means as described above.

The invention claimed is:

1. A mounting apparatus for attaching one or more solar panels to a roof top, comprising:
   a mounting base installable on a roof top; and
   a mounting bracket attached to the mounting base;
   wherein the mounting bracket comprises:
      a mounting plate,
      a first and second inner side plates connected to two opposite edges of the mounting plate and extending upward from the mounting plate perpendicularly, wherein first and second inner side plates are further connected to a respective parallel first and second outer side plates via a ridge portion, further wherein the inner and outer side plates each comprise a cutout from the top ridge thereof for receiving a frame of one or more solar panels, the cutout having two opposing side edges and a bottom edge above the mounting plate, further wherein the bottom edge of the cutout is parallel to the mounting plate and extends beyond both side edges of the cutout to form a first and second guide channels on each side edge, each of the first and second guide channels is configured to engage a L-shaped portion of a frame of a solar panel.

2. The mounting apparatus of claim 1, further comprising an attachment means for securing the solar panel onto the mounting bracket once the L-shaped portion of the frame of the solar panel is fully engaged with the first or second guide channel, wherein the attachment means comprises:
   at least a first resilient protrusion protruding from the mounting plate upwards at an angle with respect to a top surface of the mounting plate, wherein the protrusion is oriented parallel to the inner side plate and pointing away from a virtual plane across the middle of the cut-outs on both sides of the mounting plate.

3. The mounting apparatus of claim 2, wherein the first resilient protrusion has a serrated top edge configured to touch a bottom surface of the frame of the solar panel when the L-shaped portion of the frame of the solar panel is fully engaged with the first or second guide channel so that the solar panel is prevented from longitudinal movement along the guide channel.

4. The mounting apparatus of claim 3, wherein the attachment means also comprises:
   at least a second resilient protrusion protruding from the mounting plate upwards at an angle with respect to the surface of the mounting plate and oriented parallel to the virtual plane across the middle of the cut-outs on both sides of the mounting plate, wherein the second resilient protrusion has a serrated top edge configured to touch a bottom surface of the frame of the solar panel when the L-shaped portion of the frame of the solar panel is fully engaged with the first or second guide channel so that the solar panel is prevented from lateral movement perpendicular to the guide channel.

5. The mounting apparatus of claim 1, wherein at least one of the side plates of the mounting bracket has an adjustment means for engaging with the mounting base and adjusting position of the mounting bracket relative to the mounting base.

6. The mounting apparatus of claim 5, wherein the adjustment means comprises at least a supporting arm extending from one of the side plates perpendicularly so that the supporting arm will engage with an adjustment channel on a side of the mounting base and is slidable along the adjustment channel when the mounting bracket is placed on the mounting base, wherein the adjustment channel is parallel to mounting plate of the mounting bracket.

7. The mounting apparatus of claim 6, wherein the adjustment means further comprises one or more teeth that engage with one or more of an array of apertures on a side of the mounting base while the mounting bracket is moving along the adjustment channel on the mounting base.

8. The mounting apparatus of claim 6, wherein the adjustment means further comprises an array of apertures defined by one of the side plates, wherein one or more of the array of apertures will engage with one or more teeth on a side of the mounting base while the mounting bracket is moving along the adjustment channel on the mounting base.

9. The mounting apparatus of claim 7, wherein the adjustment means further comprises a locking means configured to lock the mounting bracket relative to the mounting base.

10. The mounting apparatus of claim 9, wherein the locking means comprises a locking hole on at least one of the side plates of the mounting bracket for receiving a locking pin therethrough to engage with a side of the mounting base so that the mounting bracket is locked into position.

11. The mounting apparatus of claim 10, wherein each of the inner and outer side plates or the mounting plate has one or more reinforcement bars attached thereon.

12. The mounting apparatus of claim 1, wherein the mounting plate, the inner and outer side plates and the ridge portion are made of a one-piece metal plate.

13. The mounting apparatus of claim 4, wherein the first and second resilient plates are each formed from a cutout from the mounting plate.

14. The mounting apparatus of claim 13, wherein the mounting plate defines an aperture that is sufficiently large to allow an installation screw therethrough to reach a hole on the mounting base for mounting the mounting base to the roof top.

15. The mounting apparatus of claim 14, wherein the serrated top edge of the first or second resilient plate is configured to conductively touch the bottom frame of the solar panel to form a conductive path of grounding for preventing a lightning to the solar panel from a thunder.

16. The mounting apparatus of claim 2, comprising two pairs of the first resilient protrusions symmetrically distributed relative to the virtual plane crossing the middle of the first and second inner side plate.

17. The mounting apparatus of claim 4, comprising two pairs of the second resilient protrusions symmetrically distributed relative to the virtual plane crossing the middle of the first and second inner side plate.

18. The mounting apparatus of claim 1, wherein an entry point of the guiding channel has a convex-shaped surface.

19. A method of installing one or more solar panels on a roof top, comprising:
   (a) placing a plurality of mounting brackets on a plurality of mounting bases, wherein the plurality of mounting bases are installed in at least a first and second row, and wherein the mounting bracket comprises:
      a first and second inner side plates connected to two opposite edges of the mounting plate and extending upward from the mounting plate perpendicularly, wherein first and second inner side plates are further connected to a respective parallel first and second outer side plates via a ridge portion, further wherein the inner and outer side plates each comprise a cutout from the top ridge thereof for receiving a frame of one or more solar panels, the cutout having two opposing side edges and a bottom edge above the mounting plate, further wherein the bottom edge of the cutout is parallel to the mounting plate and extends beyond both side edges of the cutout to form a first and second guide channels on each side edge, each of the first and second guide channels is configured to engage a L-shaped portion of a frame of a solar panel;
   (b) securing the mounting brackets in the first row to the respective mounting bases;
   (c) placing a solar panel on the mounting brackets in the first row and the second row, wherein a front bottom frame of the solar panel aligns with the first guide channel of the mounting brackets in the first row, and a rear bottom frame of the solar panel aligns with the second guide channel of the mounting brackets in the second row;
   (d) sliding the front bottom frame so that an L-shaped arm of the front bottom frame fully engages with the first guide channel of the mounting bracket in the first row; and
   (e) sliding the mounting bracket in the second row so that an L-shaped arm of the rear bottom frame fully engages with the second guide channel of the mounting bracket in the second row.

20. The method of claim 19, further comprising after step (a) securing the mounting brackets in the first row to the respective mounting brackets via a locking means, and after step (d) locking the mounting bracket in the second row to the respective mounting base via a locking means.

21. A mounting bracket comprising:
   a mounting plate,
   a first and second inner side plates connected to two opposite edges of the mounting plate and extending upward from the mounting plate perpendicularly, wherein first and second inner side plates are further connected to a respective parallel first and second outer side plates via a ridge portion, further wherein the inner and outer side plates each comprise a cutout from the top ridge thereof for receiving a frame of one or more solar panels, the cutout having two opposing side edges and a bottom edge above the mounting plate, further wherein the bottom edge of the cutout extends beyond both side edges of the cutout to form a first and second guide channels on each side edge, each of the first and second guide channels is configured to engage a L-shaped portion of a frame of a solar panel.

22. The mounting bracket of claim 21, further comprising an attachment means for securing the solar panel onto the mounting bracket once the L-shaped portion of the frame of the solar panel is fully engaged with the first or second guide channel, wherein the attachment means comprises:
   at least a first resilient protrusion protruding from the mounting plate upwards at an angle with respect to a top surface of the mounting plate, wherein the protrusion is oriented parallel to the inner side plate and pointing away from a virtual plane across the middle of the cut-outs on both sides of the mounting plate.

23. The mounting bracket of claim 22, wherein the first resilient protrusion has a serrated top edge configured to touch a bottom surface of the frame of the solar panel when the L-shaped portion of the frame of the solar panel is fully engaged with the first or second guide channel so that the solar panel is prevented from longitudinal movement along the guide channel.

24. The mounting apparatus of claim 1, wherein the cutout has an opening facing up and away from the roof top when the mounting apparatus is installed on the roof top.

25. The mounting apparatus of claim 24, wherein the first and second guide channels are closer than the opening to the mounting plate.

* * * * *